United States Patent [19]

Lavoie

[11] Patent Number: 4,706,452
[45] Date of Patent: Nov. 17, 1987

[54] ENGINE

[76] Inventor: Gaston Lavoie, 145 York Street, Ottawa, Ontario, Canada, K1N 8Y3

[21] Appl. No.: 911,325

[22] Filed: Sep. 25, 1986

Related U.S. Application Data

[63] Continuation of Ser. No. 740,310, Jun. 3, 1985, abandoned, which is a continuation of Ser. No. 425,631, Sep. 28, 1982, abandoned.

[30] Foreign Application Priority Data

Oct. 22, 1981 [CA] Canada ................................. 338510

[51] Int. Cl.$^4$ ........................... F02C 3/14; F02C 3/06
[52] U.S. Cl. ................................... 60/39.35; 60/39.36
[58] Field of Search ................... 60/39.36, 39.37, 755, 60/756, 39.162, 39.163, 39.35, 262

[56] References Cited

U.S. PATENT DOCUMENTS

| | | | |
|---|---|---|---|
| 2,694,291 | 11/1954 | Rosengart | 60/39.36 |
| 2,890,570 | 6/1959 | Castles, Jr. | 60/39.35 |
| 2,981,063 | 4/1961 | Wickman | 60/39.163 |
| 3,010,281 | 11/1961 | Cervenka et al. | 60/39.37 |
| 3,058,306 | 10/1962 | Schlumbohm | 60/39.35 |
| 3,126,703 | 3/1964 | Oprecht | 60/39.36 |
| 3,892,069 | 7/1975 | Hansford | 60/39.36 |

FOREIGN PATENT DOCUMENTS 1011670  7/1957  Fed. Rep. of Germany ..... 60/39.36

Primary Examiner—Louis J. Casaregola
Assistant Examiner—Donald E. Stout
Attorney, Agent, or Firm—Holman & Stern

[57] ABSTRACT

The present invention provides an internal combustion engine comprising a main body portion defining a combustion chamber in the form of a toroidal cavity with a generally circular axis, an air intake, compressor means for drawing air from said intake and delivering it to said toroidal cavity under pressure in a generally tangential direction to impart a swirl motion to gases in said cavity about said circular axis, means for exhausting combustion gases from said cavity, drive means disposed adjacent said exhaust means so as to be acted on by said combustion gases to perform mechanical work and thereby provide an output of the engine, and means coupling said drive means to said compressor means for providing power thereto.

12 Claims, 5 Drawing Figures

ENGINE

This is a continuation of application Ser. No. 740,310 filed June 3, 1985, now abandoned, which in turn is: a Rule 62 continuation of application Ser. No. 06/425,631 filed Sept. 28, 1982, now abandoned.

This invention relates to an internal combustion engine suitable for use in an automobile or other applications where a relatively compact power source is required. Conventional reciprocating piston internal combustion engines suffer from a number of disadvantages mainly associated with the relative complexity of the control systems required to supply carefully metered amounts of fuel to the various cylinders and ensure ignition in accordance with a proper timing sequence. Additionally, the reciprocation of the pistons themselves at high speed and the subsequent transformation of the reciprocating motion and teriphery motion generate substantial stresses in the engine causing consequen wear on its components and also give rise to friction losses. However, hitherto such engines have remained the only practical option for use in small mobile applications such as in the automobile. Gas turbine engines are of course known in which air is drawn into a combustion chamber by means of a compressor, mixed with fuel and ignited before being injected through a turbine rotor. Although efficient, such engines have not been found suitable for automobile engines on account of their large size and have chiefly been used in the propulsion systems of aircraft and as relatively large stationary power sources for electric power generation.

According to the present invention there is provided an internal combustion engine comprising a main body portion defining a combustion chamber in the form of a toroidal cavity with a generally circular axis, an air intake, compressor means for drawing air from said intake and delivering it to said toroidal cavity under pressure in a generally tangential direction to impart a swirl motio to gases in said cavity about said circular axis, means for exhausting combustionn gases from said cavity, drive means disposed adjacent said exhaust means so as to be acted on by said combustion gases sto perform mechanical work and thereby provide an output of the engine, and means coupling said drive means to said compressor means for providing power thereto.

In a preferred embodiment, the toroidal cavity is formed in a main body member keyed to a central shaft rotatably mounted in bearings. Vanes are mounted in the exhaust means so that as the combustion gases exit the toroidal cavity the body is driven in rotation on the shaft. The compressor is in the form of a disk rotatably mounted on the shaft and having peripheral vanes forcing air into the cavity. A gear train coupling the disk to the shaft drives the compressor. The combustion means is in the form of a circular burner lying on the axis of the cavity to which fuel is delivered by means of a channel formed in the central shaft.

In an alternative embodiment, the main body containing the toroidal cavity is stationary and a turbine disk is arranged adjacent the exhaust means so as to be driven in rotation on a central shaft which also is coupled through a gear train to the compressor.

The invention will now be described in more detail, by way of example only, with reference to the accompanying drawings, in which.

Figure 1:
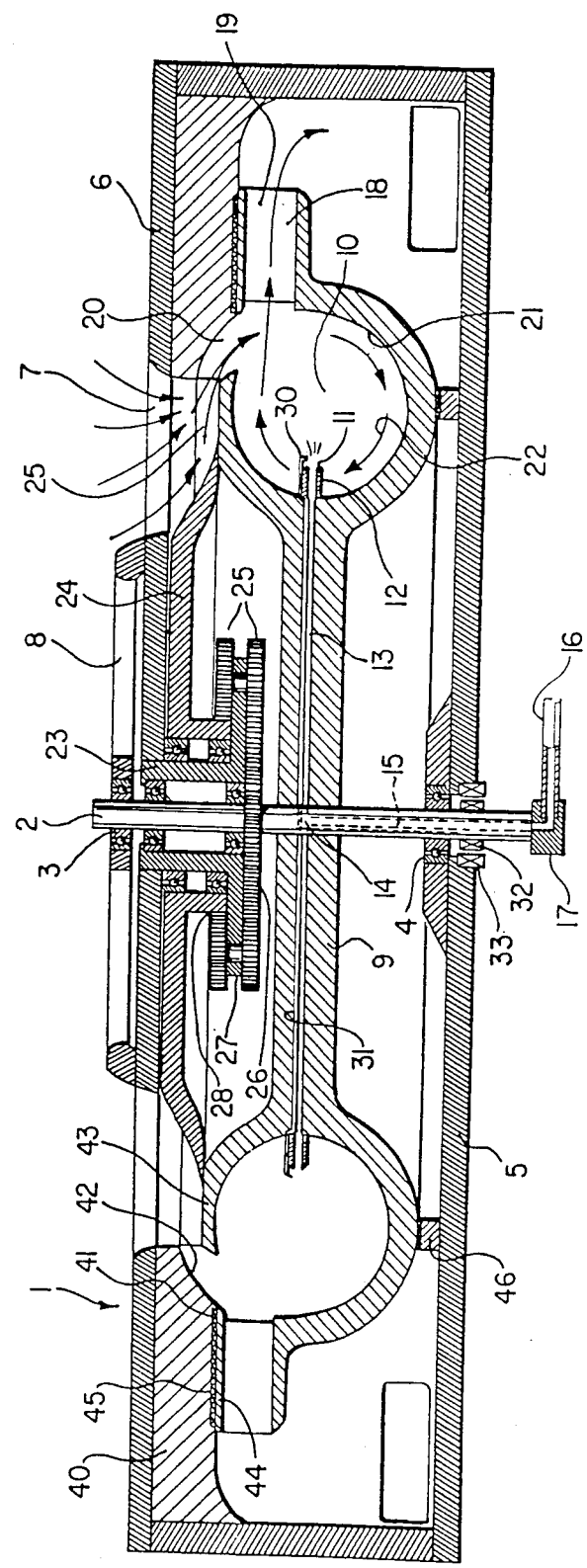
FIG. 1 is a cross-section of one embodiment of an internal combustion engine according to the invention having a rotating main body.
Figure 2:
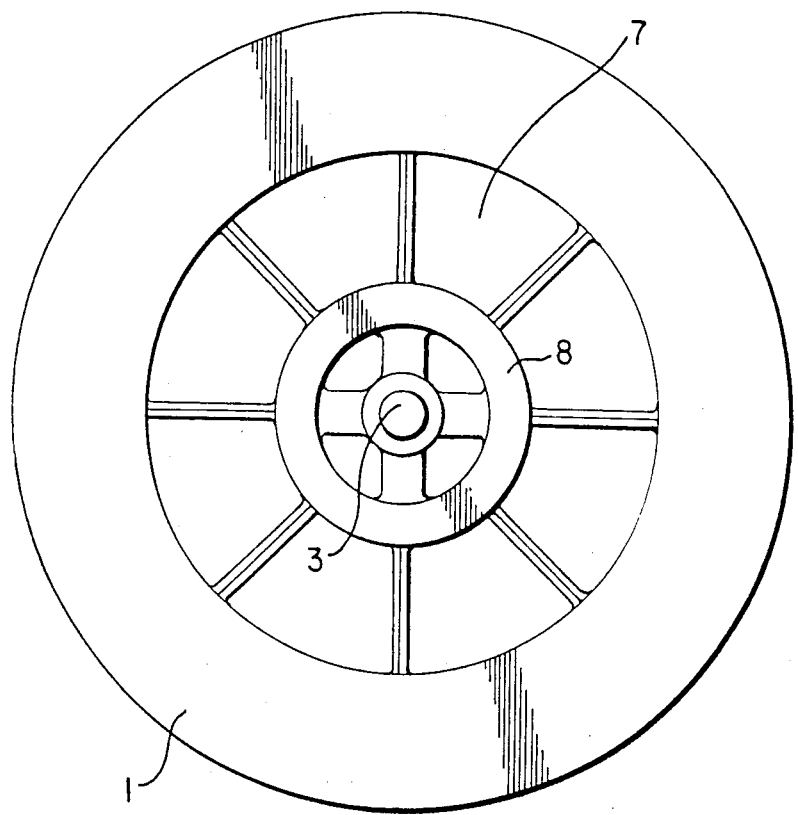
FIG. 2 is a plan view of the engine shown in FIG. 1.

In FIGS. 1 and 2, the internal air combustion engine comprises a generally cylindrical frame 1 in which a central axial shaft 2 is journalled by means of ball bearings 3 and 4 The frame 1 has a base plate 5 and a top plate 6 having an aperture therein forming an air intake 7 of the engine. A cross brace 8 extends across the air intake and carries the upper bearing 3. On the shaft 2 is keyed a rotatably main body member 9 of generally doughnut shape which around its periphery has formed therein a toroidal cavity 10 forming a combustion chamber. The main body member 9 is shown in FIG. 1 as being additionally supported on bearings 46 although these may be dispensed with by correct balance of the main body member 9. A ring burner 11 extends around the circular axis of the toroidal cavity 10 and is supported by means of radial struts 12 extending from the main body member 9. The struts 12 are circumferentially spaced around the cavity and also serve to carry fuel to the burner 11 from fuel lines 13 extending radially from the central shaft 2. The lines 12 converge at a point 14 in the shaft 2 in an axial line 15 which is supplied with fuel from an external line 15 connected to a fuel pump and coupled to the line 15 by means of a high pressure rotary seal 17.

An outlet port 18 extends circumferentially around the toroidal cavity 10. An annular stationary member 40 is fixed to the upper plate 6 of the frame 1 and has an inwardly facing curved surface 42 which with an upper lip 43 of the main body member 9 defines an inlet port 20 of the cmbustion chamber 10. A flange 44 on the main body member 9 above the outlet port 18 mates with an opposing surface of the annular stationary member 40 through a gas-tight seal 45. At spaced intervals in the outlet port 18 are fixed vanes 19 which extend outwardly in a direction which is offset by a predetermined angle to the radial direction. Gas entering the cavity 10 from the inlet port 20 in a generally tangential direction is caused to swirl around the outer wall 21 of the cavity in the direction indicated by the arrow 22 and subsequently leave the cavity through the outlet port 18 and thereby strike the vanes 19.

A bushing 23 is fitted over the upper portion of the shaft 2 below the upper bearing 3. The bushing 23 is fixed to the top plate 6 of the frame 1 and rotatably carries a compressor disk 24 by means of a bearing not shown. At its periphery the compressor disk 24 also carries upstanding compressor vanes 25 which also lie in a direction which is offset to the radius of the disk. The compressor disk 24 is coupled to the shaft 2 by means of gears 25 and 26. The gears 25 are rotatably carried by a flange 27 of the bushing 23. A toothed collar 28 depends from the center of the compressor disk 24 and meshes with idler gears 25. These in turn mesh with the gear 26 keyed onto the shaft 2. As the shaft 2 rotates, the gear train 26, 25 and 28 rotates the compressor disk with a predetermined reduction ratio.

In operation, the central shaft 2 is rotated at high speed by an external starter motor (not shown). This causes the compressor to draw air in through the intake 7 and by means of the vanes 25 force the air into the inlet port 20 of the toroidal combustion cavity 10. Since the air enters the cavity in the generally tangential direction it undergoes a swirl or vortex motion around the cavity before exiting through the outlet port 18. On passing through the outlet port 18, the exiting gas strikes the offset vanes 19 and as the result of the reaction thereagainst causes the main body member 9 and shaft 2 to start rotating relative to the frame 1. When pressure has built up to a desired level in the toroidal combustion chamber 10 the burner 11 is ignited by a spark ignition means 30 which are mounted on the strut 12 supporting the ring burner 11. The leads 31 from the ring burner 11 extend into the shaft 2 and are connected to coils 32 mounted on the outside of the shaft 2 and magnetically coupled to energizing coils 33. In this manner, electrical power may be supplied to the spark gap igniter 30 without the need for a direct electrical connection between the supply and the igniter.

On ignition, combustion takes place of the swirling gases within the toroidal chamber 10 causing a rapid rise in pressure and the gases to be forcibly ejected through the outlet port 18. The starter motor may then be disengaged and the motive force provided by the combustion gases continues to drive the compressor through the gear train. The swirling motion in the combustion chamber 10 assures optimum combustion conditions and maximum efficiency. At the high rotational speeds, the heavier combustion products tend to be thrown outwardly towards the walls of the cavity whereas the lighter combustion gases generally diffuse towards the center of the cavity where combustion takes place.

Figure 3:
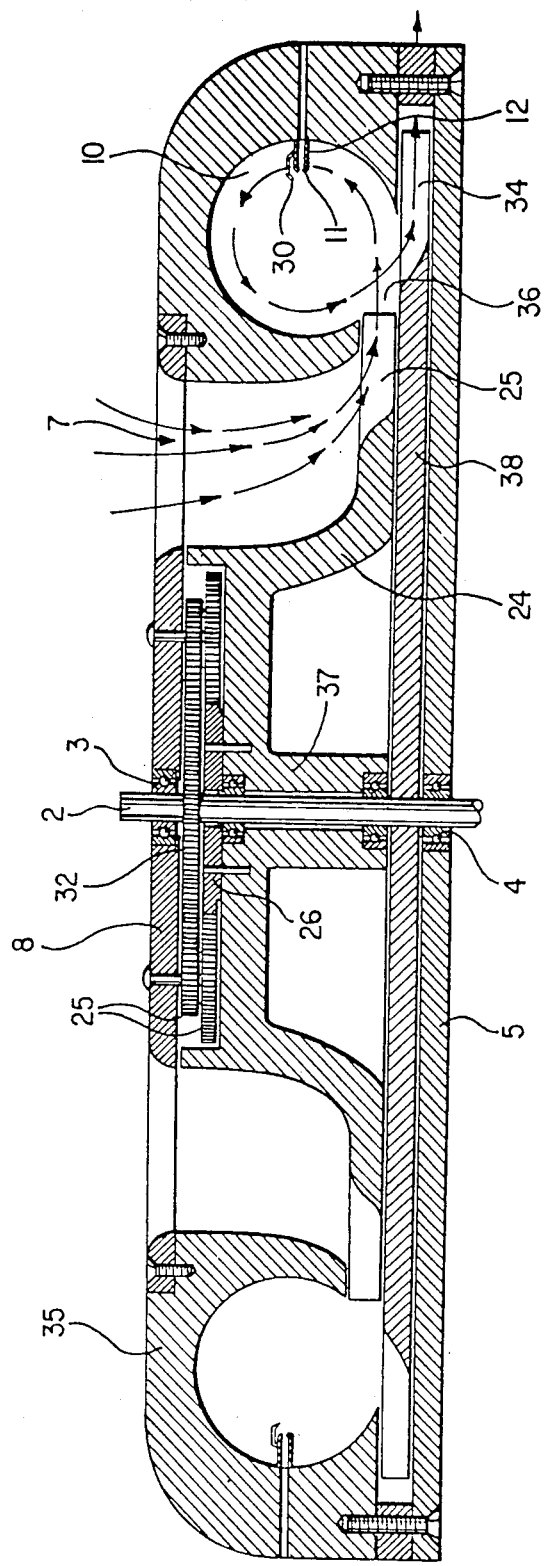
FIG. 3 is a cross-section through an alternative embodiment of the invention.

In the alternative embodiment shown in FIG. 3, the main body 35 is stationary and forms the supporting frame of the engine. The air intake 7 is formed in the main body 35 and the shaft 2 is journalled in bearings 3 and 4 in a similar manner to the embodiment of FIG. 1. The toroidal cavity 10 has a common port 36 facing the vanes 25 of the compressor disk 24. The compressor disk 24 has a hub portion 37 rotatably mounted on the shaft 2 and has keyed thereto the compressor gear 26 which through idler gears 25 meshes with a gear 32 keyed to the shaft 2. A turbine disk 38 is also keyed to the shaft 2 immediately below the compressor disk 24 and carries at its periphery upstanding vanes 34 which extend generally radially outwards but are slightly curved in the circumferential direction. A ring burner 11 provided with igniter 30 and supporting strut 12 is mounted on the circular axis of the toroidal cavity 10 in a similar manner to the embodiment of FIG. 1 with the exception that the struts 12 extend radially inwardly from the outer wall of the cavity. Also, of course, since the main body 35 is stationary, the fuel lines can be fed directly into the body and there is no need for the fluid coupling 17 of FIG. 1. In operation, the central shaft 2 is driven by a starter motor as indicated in FIG. 1. Rotation of the compressor disk 24 causes air to be drawn through the intake 7 and forced tangentially into the chamber 10 under pressure thereby setting up a swirl motion in chamber 10. When the fuel is ignited, combustion takes place and the gases are forced out of the chamber 10 at high pressure and exit through the port 36 whereupon they strike the vanes 34 of the rotor disk 38 causing the latter to rotate. Rotation of the disk 38 in turn drives the compressor through the gear train 32, 25 and 26.

The engine described has the advantage of simplicity in operation since it does not employ reciprocating parts and the fuel burns continuously in the chamber 10 thereby obviating the need for complex timing control systems. The engine can be made relatively compact and can therefore conveniently be used in small mobile applications such as automobiles. If desired, a series of engines can be banked together on a common shaft thus increasing the overall power output.

Figure 4:
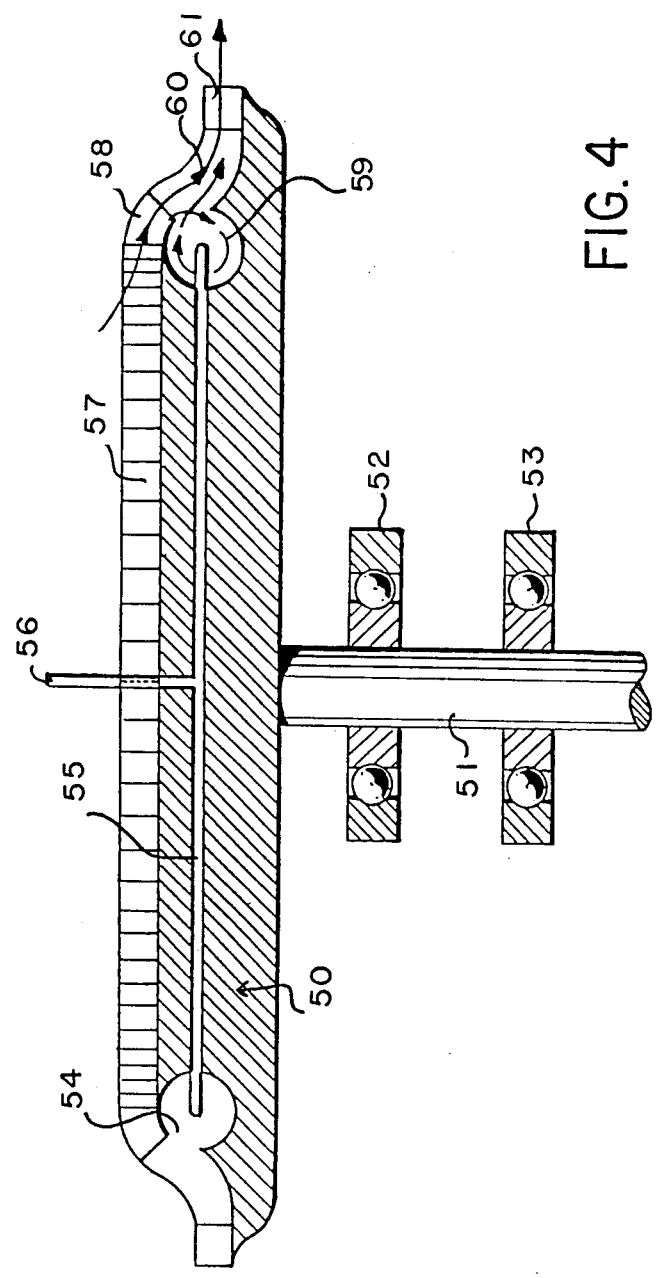
FIG. 4 is a cross-section through a part of a further embodiment.

In the embodiment of FIG. 4, a body member 50 integral with shaft 51 is rotatably supported in ball bearings 52, 53. In the periphery of the body 50 is located a toroidal cavity 54 forming the combustion chamber. A channel 55 leads from the combustion chamber to a central fuel inlet 56, which can be coupled through a rotatable coupling to a fuel supply (not shown). Vanes 57 are located on the upper surface of the body member 50 and form a compressor which, when the body member 50 is rotated, directs air into duct 58 defined with a ducted housing (not shown), where the airflow divides into a portion 54 entering the combustion chamber and a bypass portion 60. After combustion, the expanding hot exhaust gases combines with the bypass portion 60 and strike inclined drive plates 61 integral with the body member 50. As a result of the reaction of these drive plates, the body member 50 continues to rotate. The whole body member 50 is mounted in a ducted housing (not shown).

Figure 5:
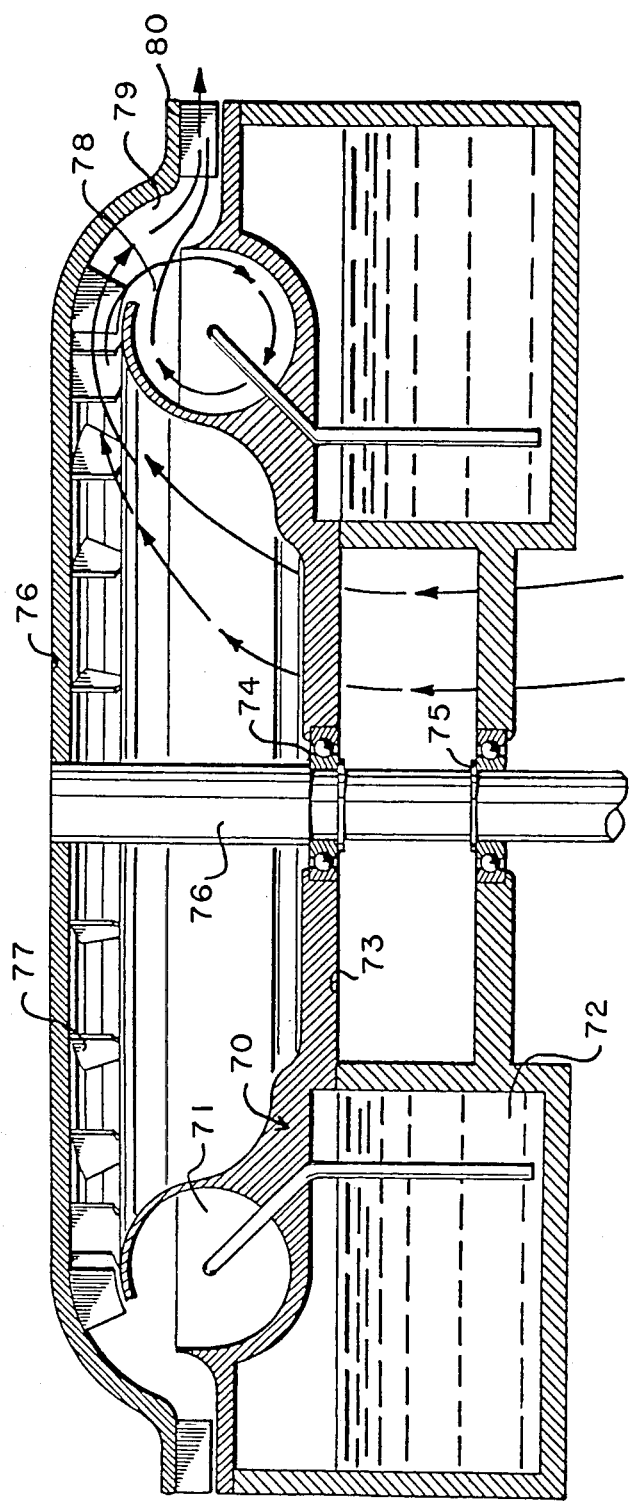
FIG. 5 shows a still further embodiment of the invention.

In the embodiment of FIG. 5, body member 70 defining toroidal cavity 71 forming a combustion chamber is stationary and includes a fuel supply 72. The central region of the body member 70 has a spider arrangement of arms 73 supporting central ball bearings 74, 75 and allowing the passage of intake air therethrough.

A central shaft 76 journalled in the bearings 74, 75 mounts a compressor disk having vanes 77 located on the underside thereof. The periphery of the compressor disk 77 curves downwardly over entrance 78 to toroidal cavity 71 to define duct 79. Inclined drive plates 80 are affixed to the underside of the periphery in duct 80.

When the compressor disk 77 is rotated, air is drawn through the central region of the body member 70 and forced into the duct 79. A portion enters the toroidal cavity where it burns with the fuel and after undergoing a swirl motion exits cavity to combine with a bypass portion of the intake air before striking drive plates 80.

I claim:

1. A turbine engine, comprising: a main body portion defining a toroidal combustion chamber lying in a plane about an axis of symmetry, said combustion chamber being bounded by an internal wall defining in cross-section, normal to said plane, a generally circular cavity, an air intake for drawing in air in the axial direction; a disk-like compressor rotatable about said axis of symmetry; said compressor carrying at its periphery upstanding vanes offset by a predetermined angle to its radii; means for supplying fuel to said combustion chamber; an exhaust port for exhausting combustion gases leaving said combustion chamber; a disk-like rotor rotatable about said axis of symmetry and driven by said combustion gases and providing an output of the engine; and means coupling said rotor to the disk-like compressor for providing power thereto, said internal wall having a gap therein to provide an opening extending around the external periphery of the combustion chamber in said plane or a plane parallel thereto to form a common inlet-outlet port; a bypass passage outside said combustion chamber extending past said common inlet-outlet port and in direct communication therewith; the periphery of said disk-like compressor being located adjacent an inlet of the bypass passage such that the compressor draws air through the intake and ejects it by centrifugal action through the bypass passage across the common inlet-outlet port in a direction generally tangential to the periphery of the combustion chamber, such that a portion of the intake air is drawn into the combustion chamber and undergoes a swirl motion about the circular axis of the combustion chamber, and a portion of the intake air flows over the common port and thereby bypasses the combustion chamber; said exhaust port being located adjacent the outlet of said bypass passage whereby it also exhausts intake air bypassing said common port and said combustion gases leave said combustion chamber in a generally tangential direction; and said disk-like rotor having rotor vanes located adjacent said exhaust means whereby said rotor is also driven by a mixture of intake and exhaust air passing through the bypass passage.

2. An engine according to claim 1 wherein said main body portion is keyed to a central shaft rotatably mounted in a frame, said disk-like compressor comprises a disk rotatably mounted on said shaft and coupled thereto by means of a gear train, and said disk has peripheral vanes set at an angle relative to the radii of said disk, which on rotation of the disk force intake air through said bypass passage.

3. An engine according to claim 1 wherein the rotor vanes extend generally in the radial direction with slight curvature in the tangential direction.

4. An engine according to claim 1 wherein a ring burner is mounted generally along the circular axis of the toroidal combustion chamber, and a fuel line extends from the burner through the wall of the cavity radially inwards to said shaft and along the axis of said shaft to a rotary coupling, where said fuel line is coupled to a stationary external supply line.

5. An engine according to claim 1 wherein the body portion is stationary, said disk-like rotor comprises a rotor disk keyed to a central shaft and having peripheral vanes adjacent said common port of said combustion chamber, and said compressor comprises a compressor disk in opposed relationship with said rotor disk and having peripheral vanes for forcing air into said combustion chamber through said common port, said compressor disk being coupled to said rotor disk through a gear train.

6. An engine according to claim 5 wherein said common port comprises a circular aperture level with and in opposed relationship with said compressor vanes, and said rotor vanes are located adjacent said aperture whereby a portion of the air from said compressor enters said combustion chamber through said common port, undergoes a swirl motion in said combustion chamber, and, after combustion, mixes with the bypass portion passing through the bypass passage, whereupon the bypass portion and combustion gases are directed onto said rotor vanes to drive said rotor disk.

7. An engine according to claim 6 wherein a ring burner is disposed along the circular axis of the combustion chamber and supported by means of struts extending inwardly from the wall of the combustion chamber.

8. An engine according to claim 5 further comprising a bottom plate fitted under said rotor disk and defining with said main body portion an exhaust port for combustion gases from th engine, the vanes of said rotor disk extending into said exhaust port.

9. An engine according to claim 1 wherein the main body portion is integral with a shaft rotatably mounted in bearings, a plurality of compressor vanes are located on an upper surface of said main body portion to form said disk-like compressor, and said rotor vanes are locked on the periphery of said main body portion, whereby said compressor directs intake air over the common port where a portion enters said combustion chamber to be burnt with fuel therein and after undergoing a swirl motion in said combustion chamber exits to combine with a bypass portion in the bypass passage before striking said rotor vanes to impart rotational motion to said body member.

10. An engine according to claim 9 wherein a peripheral portion of the main body member defines with a stationary housing a duct through which air from the compressor flows past the entrance of the toroidal cavity.

11. An engine according to claim 1 wherein the toroidal combustion chamber is located at the periphery of a generally bowl-shaped part of the main body member, a compressor disk having vanes on its underside and mounted on a shaft extending through bearings in a central region of said main body member covers said bowl-shaped part, said rotor vanes are mounted on the periphery of said compressor disk in said bypass passage, and said central region of the compressor disk draws air through the central region and forces it out through said bypass passage, where a portion enters said toroidal cavity to be burnt with fuel therein, which portion after undergoing a swirl motion in said cavity exits to combine with the bypass portion in the bypass passage before striking said rotor vanes.

12. An engine according to claim 11 wherein said main body member also includes a fuel tank disposed below the toroidal cavity.

* * * * *